United States Patent
Lin

(10) Patent No.: US 11,191,226 B2
(45) Date of Patent: Dec. 7, 2021

(54) FOLDABLE WATERING POT

(71) Applicant: Tianwen Lin, Taizhou (CN)

(72) Inventor: Tianwen Lin, Taizhou (CN)

( * ) Notice: Subject to any disclaimer, the term of this patent is extended or adjusted under 35 U.S.C. 154(b) by 161 days.

(21) Appl. No.: 16/318,375

(22) PCT Filed: Aug. 26, 2017

(86) PCT No.: PCT/CN2017/099200
§ 371 (c)(1),
(2) Date: Jan. 17, 2019

(87) PCT Pub. No.: WO2018/041057
PCT Pub. Date: Mar. 8, 2018

(65) Prior Publication Data
US 2019/0239456 A1 Aug. 8, 2019

(30) Foreign Application Priority Data

Aug. 27, 2016 (CN) .......................... 201620962278.1

(51) Int. Cl.
*A01G 25/14* (2006.01)
*B65D 77/06* (2006.01)
(Continued)

(52) U.S. Cl.
CPC ........... *A01G 25/14* (2013.01); *B65D 47/065* (2013.01); *B65D 47/20* (2013.01); *B65D 61/00* (2013.01);
(Continued)

(58) Field of Classification Search
CPC ........ B05B 11/00412; B05B 11/00414; A01G 25/14; A01G 25/145; B65D 25/46;
(Continued)

(56) References Cited

U.S. PATENT DOCUMENTS

| | | | | |
|---|---|---|---|---|
| 2,690,930 A | * | 10/1954 | Corson | A01G 25/14 239/316 |
| 3,251,516 A | * | 5/1966 | Thomas | B65D 47/305 222/536 |
| 4,314,654 A | * | 2/1982 | Gaubert | B67B 7/26 222/182 |
| 6,390,331 B2 | * | 5/2002 | Schutz | B65D 77/0466 222/105 |

(Continued)

FOREIGN PATENT DOCUMENTS

CN 201153428 Y 11/2008
CN 203261927 U 11/2013
(Continued)

OTHER PUBLICATIONS

International Search Report of PCT/CN2017/099200.

*Primary Examiner* — Alex M Valvis
(74) *Attorney, Agent, or Firm* — Minder Law Group; Willy H. Wong

(57) ABSTRACT

A foldable watering pot comprises a framework, a container, and a spout. An inside of the framework is hollow. The container is detachably mounted in a hollow portion of the framework, the container is made of a soft waterproof material, and an inlet is disposed on a top of the container, and a lid is disposed on the inlet for sealingly connected with the inlet. An outlet is disposed on a side of the container, the spout is disposed at one side of the framework, the outlet is connected to the spout through a connecting device, and the spout is rotatably connected with the framework and can form a seal for the outlet. The present invention can make the container shrinkable by the above structures, and therefore the watering pot can be conveniently stored and space can be saved.

18 Claims, 9 Drawing Sheets

(51) Int. Cl.
*B65D 47/20* (2006.01)
*B65D 47/06* (2006.01)
*B65D 61/00* (2006.01)
*B65D 47/18* (2006.01)

(52) U.S. Cl.
CPC .......... *B65D 77/062* (2013.01); *B65D 47/185* (2013.01)

(58) Field of Classification Search
CPC ...... B65D 47/066; B65D 45/02; B65D 45/30; B65D 47/00; B65D 47/20; B65D 47/2006; B65D 47/30; B65D 77/062; B65D 61/00; A01M 7/0046
USPC ........ 239/376, 377; 222/465.1; 220/9.1, 9.2, 220/9.4, 23.87
See application file for complete search history.

(56) References Cited

U.S. PATENT DOCUMENTS

| 6,776,314 B2* | 8/2004 | Odet ...................... B65D 45/30 |
| | | 215/235 |
| 7,066,358 B2* | 6/2006 | Monsalve .............. A01G 25/14 |
| | | 222/158 |
| 9,415,994 B2* | 8/2016 | Ouderkirk ................ B67D 7/04 |
| 2016/0143233 A1* | 5/2016 | Pinto Chulvi ............ A45F 3/20 |
| | | 224/148.2 |

FOREIGN PATENT DOCUMENTS

| CN | 203801423 U | 9/2014 |
| GN | 2139793 Y | 8/1993 |
| GN | 203985360 U | 12/2014 |
| GN | 204467987 U | 7/2015 |
| JP | 2009-243710 | 5/2011 |

* cited by examiner

FOLDABLE WATERING POT

RELATED APPLICATIONS

This application is a national stage entry of International Application No. PCT/CN2017/099200 filed Aug. 26, 2017, and claims benefit of Chinese Patent Application No. CN201620962278.1 filed Aug. 27, 2016.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention belongs to the technical field of watering pot, and more particularly relates to a foldable watering pot.

Related Art

At present, existing watering pots are generally large in size, and watering pot in life is a common tool used by people to water flowers and irrigate soil, but the general watering pots are large and constant in volume, have deficiencies of taking up space and being inconvenient to store, and the watering flow rate of general watering pots cannot be controlled.

SUMMARY OF THE INVENTION

One object of one embodiment of the present invention is to provide a foldable watering pot which is small in size, convenient to use, and can adjust the water discharge amount of a nozzle.

The technical solutions adopted by one embodiment of the present invention to solve the technical problems are:

a foldable watering pot comprising a framework, a container, and a spout, an inside of the framework being hollow, the spout being disposed at one side of the framework, the container being detachably mounted in a hollow portion of the framework, an inlet being disposed on a top of the container, an outlet being disposed on a side of the container, and the outlet being connected to the spout through a connecting device;

the connecting device comprising a coupler communicating with the outlet and fixedly connected to the container; and a rotary mounting hole being disposed on two sides of the coupler, the rotary mounting hole being capable of connecting the spout, a rotary mounting pin being disposed on two sides of the spout, the spout being rotatably connected with the coupler, an end of the spout connecting with the coupler being a cylindrical or spherical coupling end, the coupler being disposed with a matching arcuate groove, and the coupling end being disposed with an opening communicating with a water outlet pipe of the spout.

One embodiment of the coupler is disposed with positioning holes on the two sides of the coupler, inside the framework is correspondingly disposed with positioning pins matching the positioning holes, and the framework is further disposed with a flange capable of wrapping an edge of the coupler.

Inside one embodiment of the coupler is disposed with a seal ring sealingly connected with the coupling end.

One embodiment of the framework comprises a left frame and a right frame.

One embodiment of the spout is connected with a nozzle, the nozzle comprises a hull, a base spray plate, and a rotary spray plate rotatably connected to an edge of the hull, and the rotary spray plate and the base spray plate are disposed with perforations.

One embodiment of the container is flexible, made of a soft waterproof material.

One embodiment of the framework is further disposed with an inverted L-shaped handle on one side of the framework.

One embodiment of the inlet comprises an assembly and a threaded connector, the inlet is disposed with an inlet penetrating the assembly and the connector, and the inlet communicates with an inner cavity of the container.

One embodiment of the inlet and the container are made of a same material, and a wall thickness of the inlet is greater than a wall thickness of the container.

One embodiment of the framework is disposed with a passage, the assembly is disposed in the passage and connected with the framework, and the connector extends outside of the framework.

One embodiment of the assembly has at least one bulge, and inside the passage of the framework is disposed with a positioning groove matching the bulge.

One embodiment of the connector is connected with a lid, and the lid is capable of forming a seal with the connector.

One embodiment of the connector is disposed with at least one turn of external thread, and the lid is disposed with at least one turn of internal thread matching the external thread of the connector. The lid and the connector can be connected by interlocking or other connecting methods, but, in order to ensure the reliability of the connection, preferably by thread connection method.

One embodiment of the lid is disposed with a positioning member, when the lid is connected to the inlet, the positioning member abuts tightly against an inner wall of the inlet.

One embodiment of the positioning member is a positioning ring disposed in the lid, the positioning ring has a sloped outer wall, a diameter of the outer wall gradually decreases from an inner end surface of the lid in an axial direction away from the inner end surface of the lid.

One embodiment of the outer wall located on the inner end surface of the lid has a diameter slightly larger than a diameter of the inlet, and a diameter of the outer wall away from the inner end surface of the lid is slightly smaller than the diameter of the inlet.

One embodiment of an end face of the connector is a flat surface, and the end face is capable of mating with the inner end surface of the lid to form a seal.

Two sides of one embodiment of the coupling end are disposed with a limiting slot, and at least one of the positioning pins extends outside of the positioning hole to be located in the limiting slot.

The technical effects of one embodiment of the present invention over the prior art that are outstanding and beneficial are:

1. The present invention adopts a foldable structure of the spout, so that the watering pot can be conveniently stored to save space.

2. The present invention adopts a soft waterproof material for making the container, so that the watering pot is convenient for storage and transportation.

3. The nozzle of the present invention is designed in such a way that the water discharge amount of the nozzle can be adjusted for convenience of use.

4. The handle of the present invention is designed in such a way that a user can grasp at different positions according to his own preferences.

DETAILED DESCRIPTION OF THE INVENTION

Figure 1:
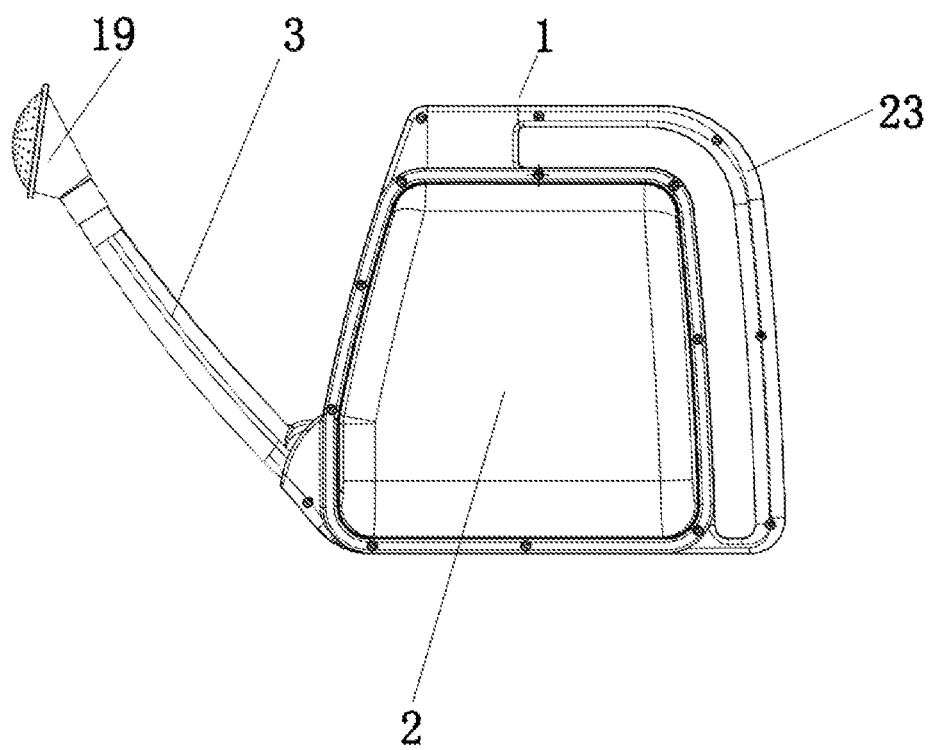
FIG. 1 is a schematic view of one embodiment of a foldable watering pot of the present invention.
Figure 2:
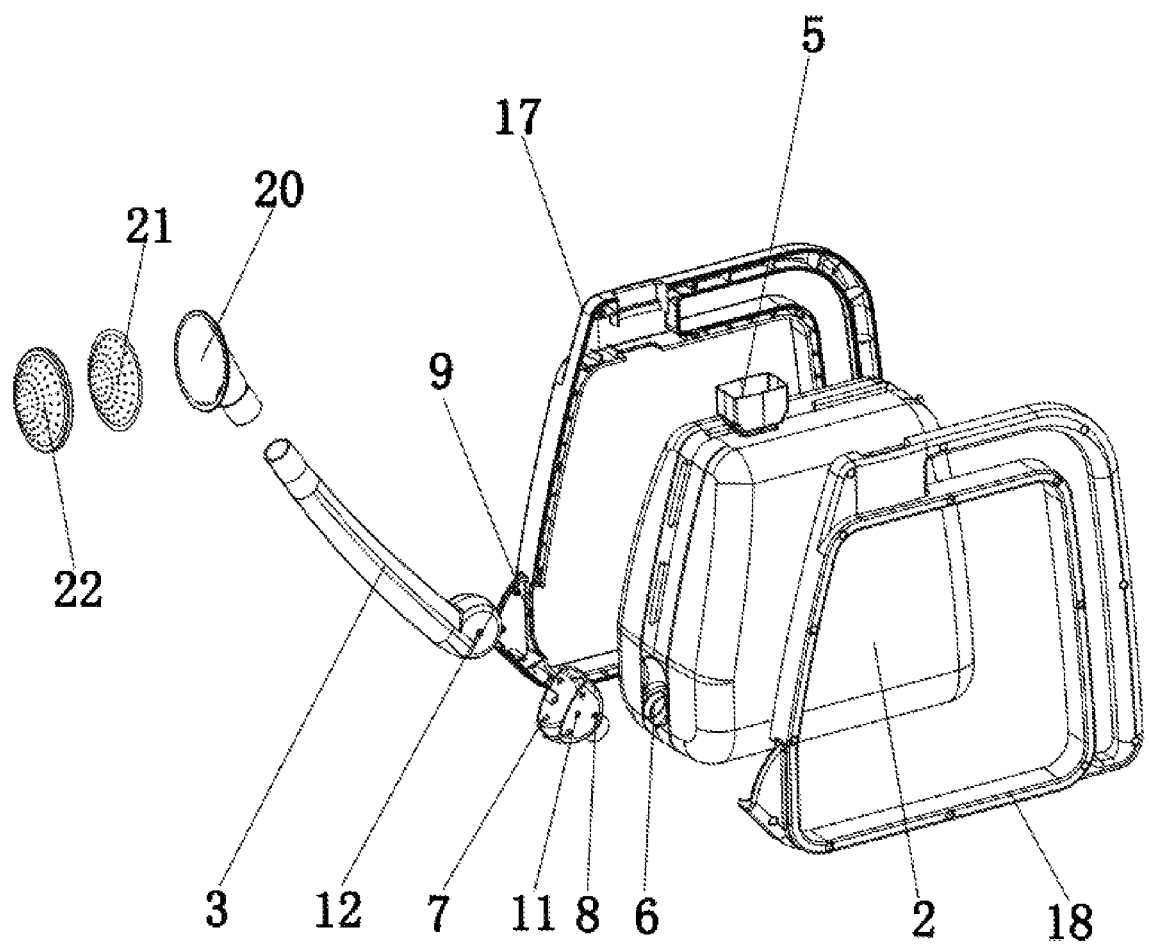
FIG. 2 is an exploded perspective view of one embodiment of the foldable watering pot of the present invention.
Figure 3:
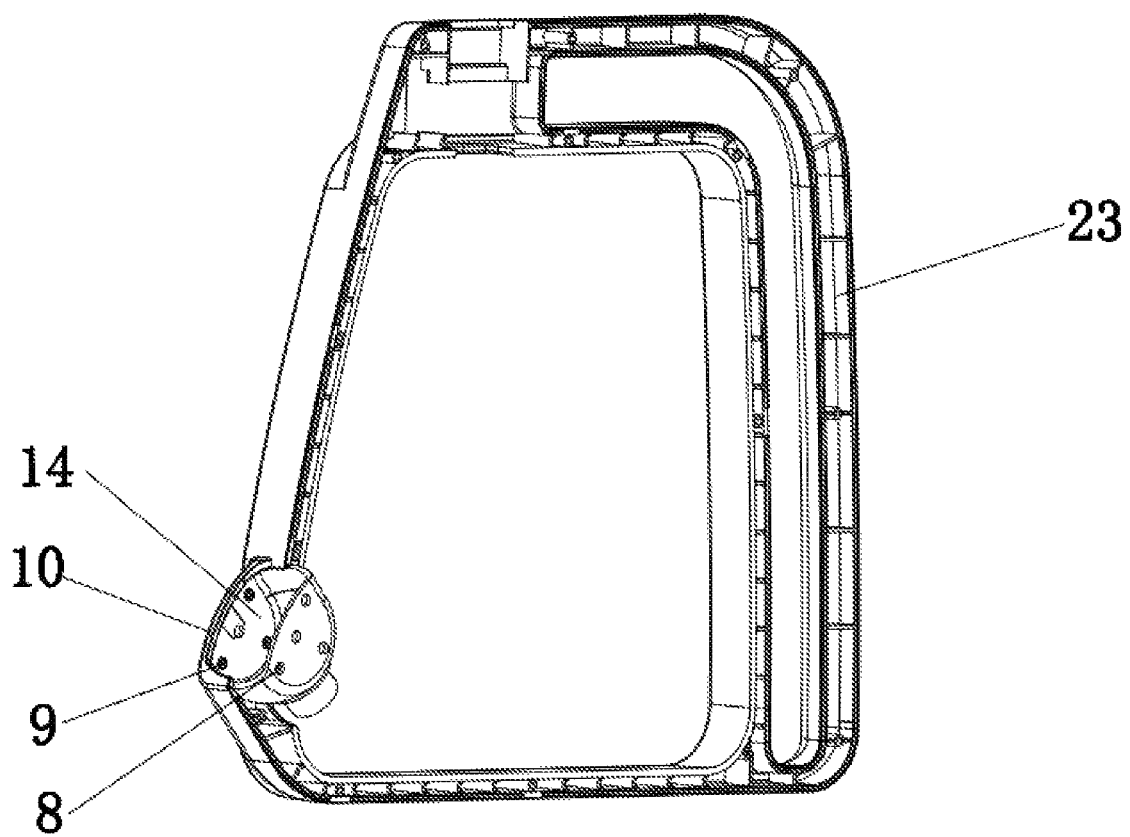
FIG. 3 is a schematic view of the connection structure between a coupler and a framework of one embodiment of the foldable watering pot of the present invention.
Figure 4:
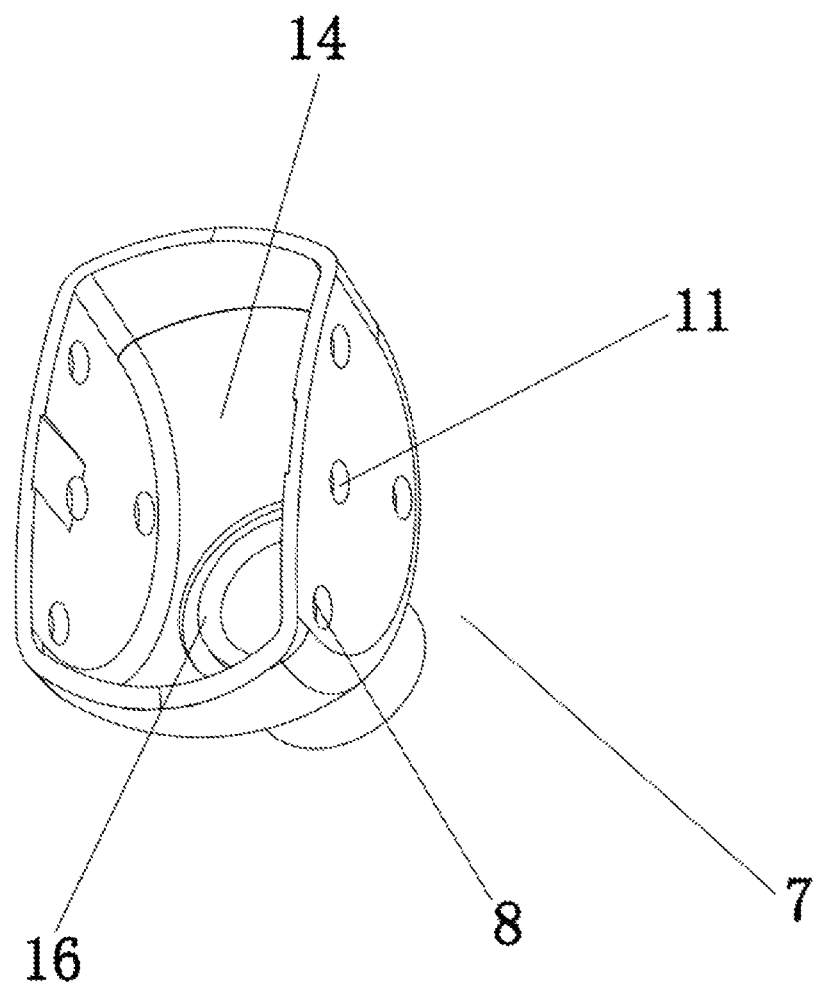
FIG. 4 is a perspective view of the coupler of one embodiment of the foldable watering pot of the present invention.
Figure 5:
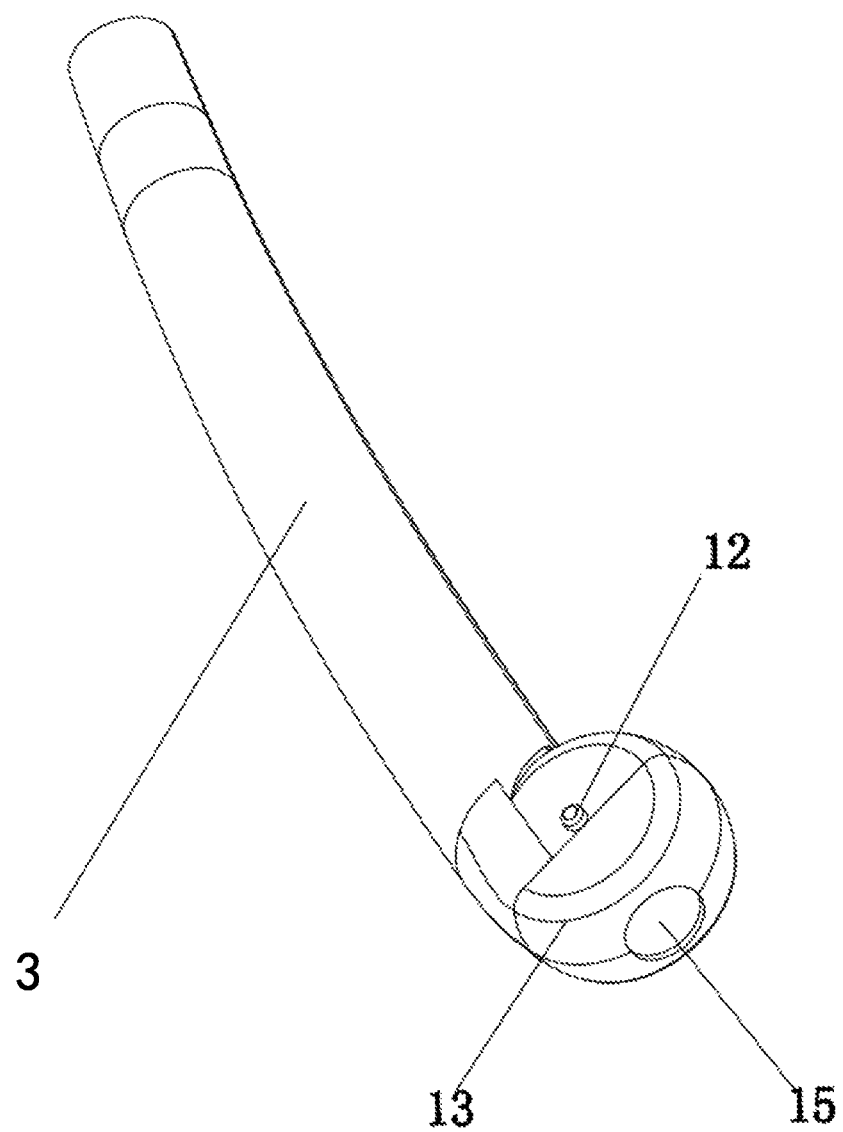
FIG. 5 is a perspective view of a spout of one embodiment of the foldable watering pot of the present invention.

The technical solutions of the present invention are further described below with reference to the specific embodiments of the present invention in conjunction with the accompanied drawings, but the present invention is not limited to the embodiments.

Embodiment 1

One embodiment of a foldable watering pot, as shown in FIG. 1 to FIG. 5, comprises a rigid framework 1, a flexible container 2, and a spout 3, an inside of the framework 1 is hollow, the spout 3 is disposed at one side of the framework 1, the container 2 is detachably mounted in a hollow portion of the framework 1, an inlet component 5 is disposed on a top of the container 2, an outlet 6 is disposed on a side of the container 2, and the outlet 6 is connected to the spout 3 through a connecting device.

One embodiment of the connecting device comprises a coupler 7 communicating with the outlet 6 and fixedly connected to the container 2.

One embodiment of a rotary mounting hole 11 is disposed on two sides of the coupler 7, the rotary mounting hole 11 is capable of connecting the spout 3, a rotary mounting pin 12 is disposed on two sides of the spout 3, the spout 3 is rotatably connected with the coupler 7, an end of the spout 3 connecting with the coupler 7 is a cylindrical or spherical coupling end 13, the coupler 7 is disposed with a matching arcuate groove 14, and the coupling end 13 is disposed with an opening 15 communicating with a water outlet pipe of the spout 3. The coupling end 13 of the spout 3 is rotatably connected with the coupler 7, and the coupler 7 is provided with a hole matching the opening 15. When the spout 3 is rotated, the opening 15 is variably communicated with the hole. When the spout 3 is folded to a certain angle, the hole of the coupler 7 is not communicated with the opening 15, so that the water in the watering pot does not flow out. When the spout 3 is unfolded to a certain angle, the opening 15 is communicated with the hole, and as an unfolding angle increases, a communicating cross-section between the opening 15 and the hole increases.

One embodiment of the coupler 7 is disposed with positioning holes 8 on the two sides of the coupler 7, inside the framework 1 is correspondingly disposed with positioning pins 9 matching the positioning holes 8, and the framework 1 is further disposed with a flange 10 capable of wrapping an edge of the coupler 7. The flange 10 also limits an angle of rotation of the spout 3. The cooperation of the positioning pins 9 and the positioning holes 8 allows the coupler 7 to be securely mounted on the framework 1. Preferably, there are three of the positioning holes 8 on each of the sides of the coupler 7 to form a triangular positioning, and can also be other quantities of the positioning holes 8.

Inside one embodiment of the coupler 7 is disposed with a seal ring 16 sealingly connected with the coupling end 13. The seal ring 16 is used to prevent water leakage.

One embodiment of the framework 1 comprises a left frame 17 and a right frame 18.

One embodiment of the spout 3 is connected with a nozzle 19.

One embodiment of the nozzle 19 comprises a hull 20, a base spray plate 21, and a rotary spray plate 22 rotatably connected to an edge of the hull 20, and the rotary spray plate 22 and the base spray plate 21 are disposed with perforations. In use, the rotary spray plate 22 can be rotated to change an amount of water discharged from each of the perforations, thereby achieving the purpose of adjusting a water discharge amount of the watering pot.

One embodiment of the container 2 is made of a soft waterproof material. The soft material allows the container 2 to be shrunk for easy transport and storage. When not in use, the container 2 of the watering pot can be squeezed by hands to shrink it into the framework 1.

One embodiment of the framework 1 is further disposed with an inverted L-shaped handle 23 on one side of the framework 1. The design of the handle 23 allows a user to grasp at different positions according to his own preferences. A curved portion of the handle 23 is an arcuate surface, which is convenient for the user to hold and makes the user feel comfortable when holding the handle 23.

Figure 6:
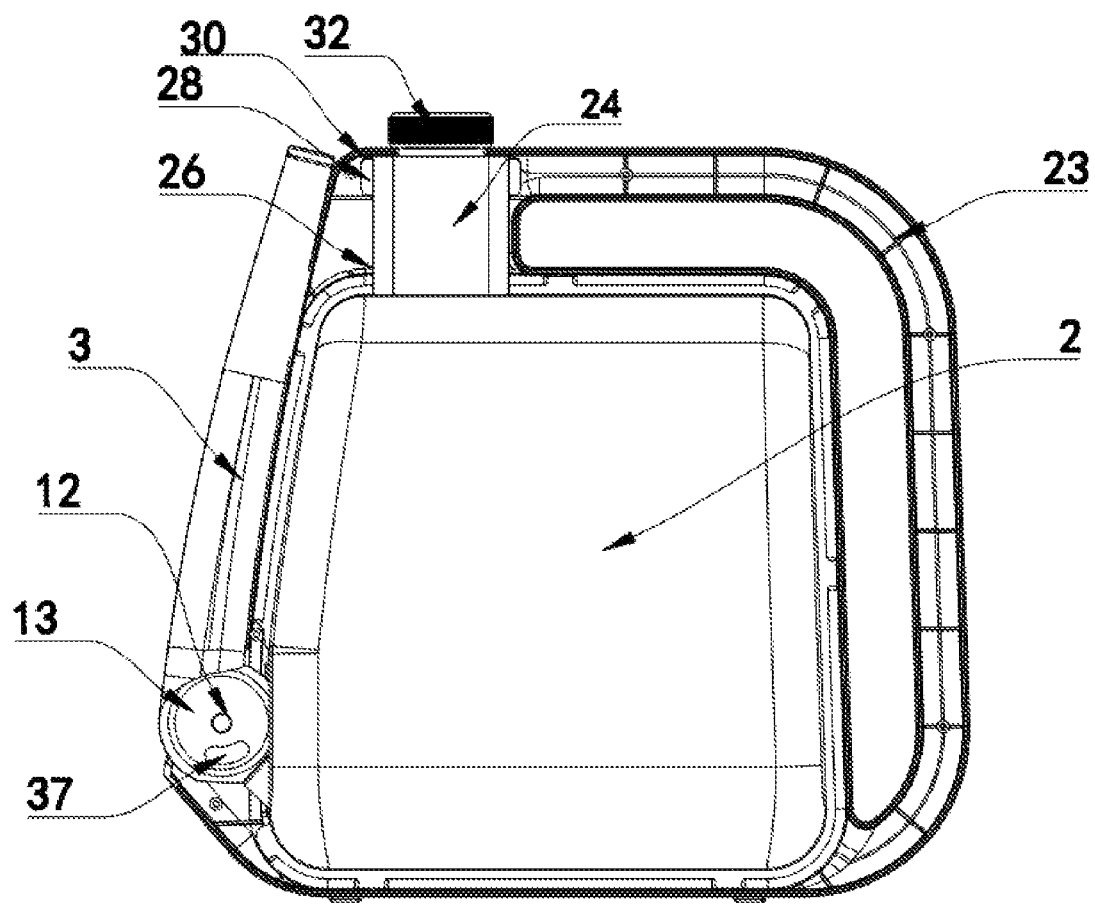
FIG. 6 is a schematic view of one embodiment of the foldable watering pot of the present invention, with one side frame removed.
Figure 7:
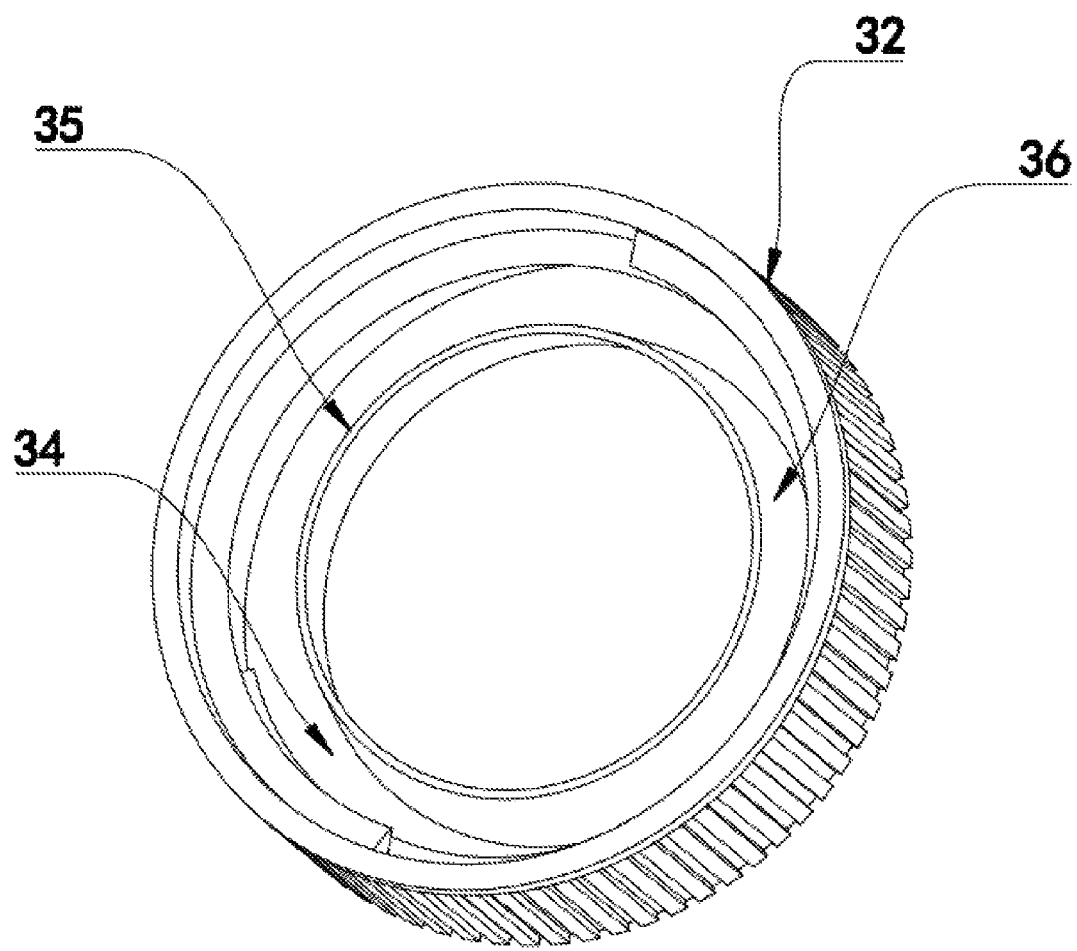
FIG. 7 is a perspective view of a lid of one embodiment of the foldable watering pot of the present invention.
Figure 8:
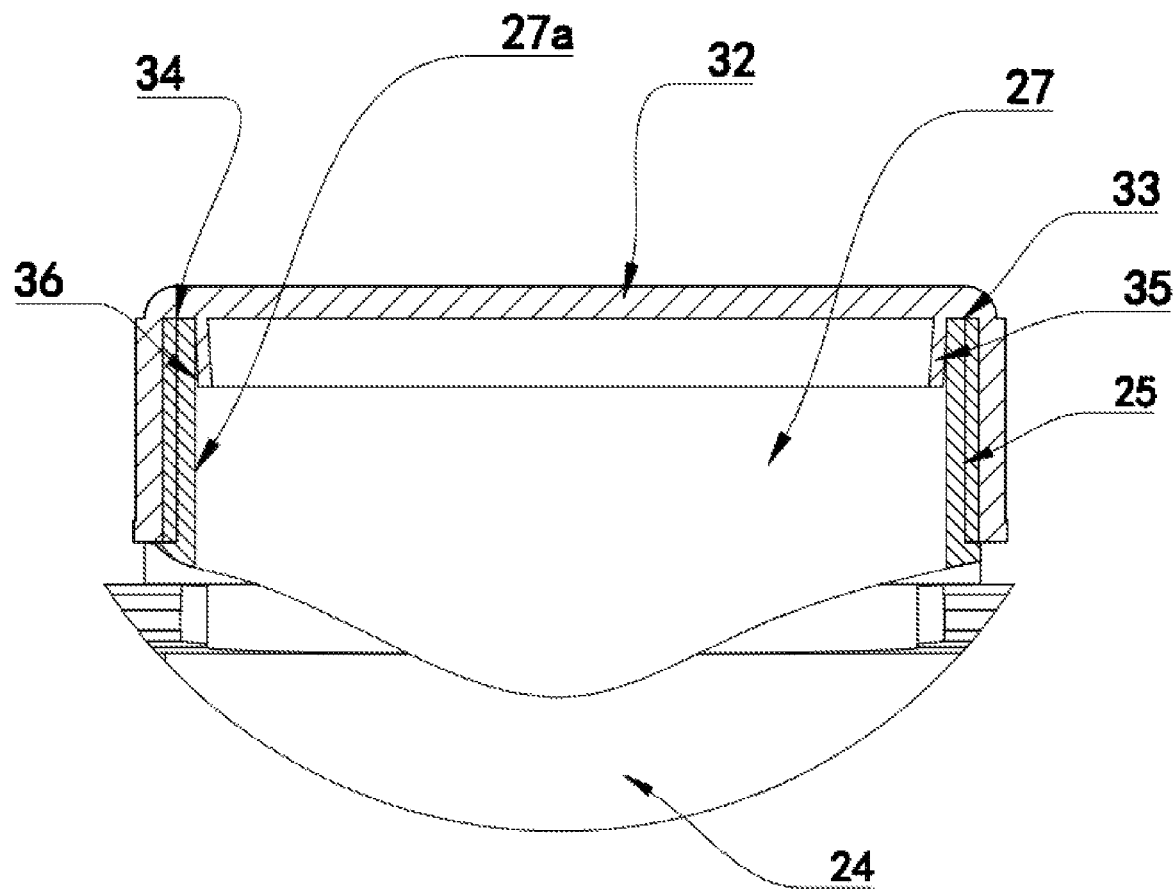
FIG. 8 is a cross-sectional structural view of the connection state of the lid of one embodiment of the foldable watering pot of the present invention.

As shown in FIGS. 6 to 8, one embodiment of the inlet component 5 and the container 2 are made of a same material and integrated, so that the container 2 with the inlet component 5 can be integrally moulded for convenient processing and installation. The inlet component 5 comprises an assembly 24 and a threaded connector 25. The framework 1 is disposed with a passage 26, and the assembly 24 is disposed in the passage 26 and connected with the framework 1. The inlet component 5 is disposed with an inlet 27 penetrating the assembly 24 and the connector 25, the inlet 27 communicates with an inner cavity of the container 2, and a wall thickness of the inlet component 5 is greater than a wall thickness of the container 2. By setting the wall thickness of the inlet component 5 larger than the wall thickness of the container 2, the strength of the inlet component 5 is enhanced, which not only facilitates the installation of the assembly 24 on the framework 1, but also provides the connector 25 with better connection strength.

One embodiment of the assembly 24 has at least one bulge 28, and inside the passage 26 of the framework 1 is disposed with a positioning groove 30 matching the bulge 28. In this embodiment, the assembly 24 has two of the bulges 28, and the framework 1 is provided with the two positioning grooves 30 matching the bulges 28. When the container 2 is mounted on the framework 1, the bulges 28 of the assembly 24 are disposed in the positioning grooves 30 of the framework 1 to form a connection. Since both the inlet component 5 and the container 2 are made of a soft waterproof material, the structure setting can improve the overall strength of the inlet component 5 and ensure the connection stability and sealing performance of the connector 25.

One embodiment of the connector 25 is disposed with at least one turn of thread, and an end face 33 of the connector 25 is a flat surface. In this embodiment, the connector 25 extends outside of the framework 1, and is provided with a complete turn of external thread, and the connector 25 is connected with a lid 32 through the thread. The lid 32 is disposed with at least one complete turn of internal thread matching the external thread of the connector 25. When the lid 32 is tightened, it can be connected with the thread of the connector 25 to form a seal. A turn of the external thread is disposed on the connector 25 to make the structure of the connector 25 simple and compact, further ensuring the strength of the inlet component 5, and a complete turn of the external thread is already sufficient to mate with the internal thread of the lid 32 to form a primary seal.

As shown in FIGS. 7 and 8, one embodiment of an inner end surface 34 of the lid 32 is disposed with a positioning member, and the positioning member in this embodiment is an annular positioning ring 35 disposed in the lid 32. The positioning ring 35 has a sloped outer wall 36, a diameter of the outer wall 36 gradually decreases from the inner end surface 34 in an axial direction away from the inner end surface 34 of the lid 32, the outer wall 36 located on the inner end surface 34 of the lid 32 has a diameter larger than a diameter of the inlet 27, and a diameter of the outer wall 36 away from the inner end surface 34 of the lid 32 is smaller than the diameter of the inlet 27. When the lid 32 is connected on the inlet component 5, not only the positioning ring 35 can be quickly inserted into the inlet 27 to support and position the connector 25, but also an inner wall 27a of the inlet 27 can be tightly fitted with the outer wall 36 of the positioning ring 35 to form a secondary seal. The lid 32 is further tightened, and the end face 33 of the connector 25 is mated with the inner end surface 34 between the outer wall 36 of the positioning ring 35 and the inner thread of the lid 32 to further form a tertiary seal.

In the present invention, one embodiment of the inlet 27 of the container 2 is sealed by connecting the lid 32 with the connector 25, and the spout 3 and the coupler 7 seal the outlet 6, thereby forming the container 2 into a sealed space. Therefore, when the watering pot of the present invention is not needed, the lid 32 can be opened or the spout 3 can be connected with the container 2, so as to squeeze the container 2 to discharge the internal air, and then tighten the lid 32 or rotate the spout 3 to seal the outlet 6 of the container 2, so that the container 2 is kept in a shrunk state, and therefore the entire watering pot takes up less space and is convenient for storage and transportation.

Embodiment 2

Figure 9:
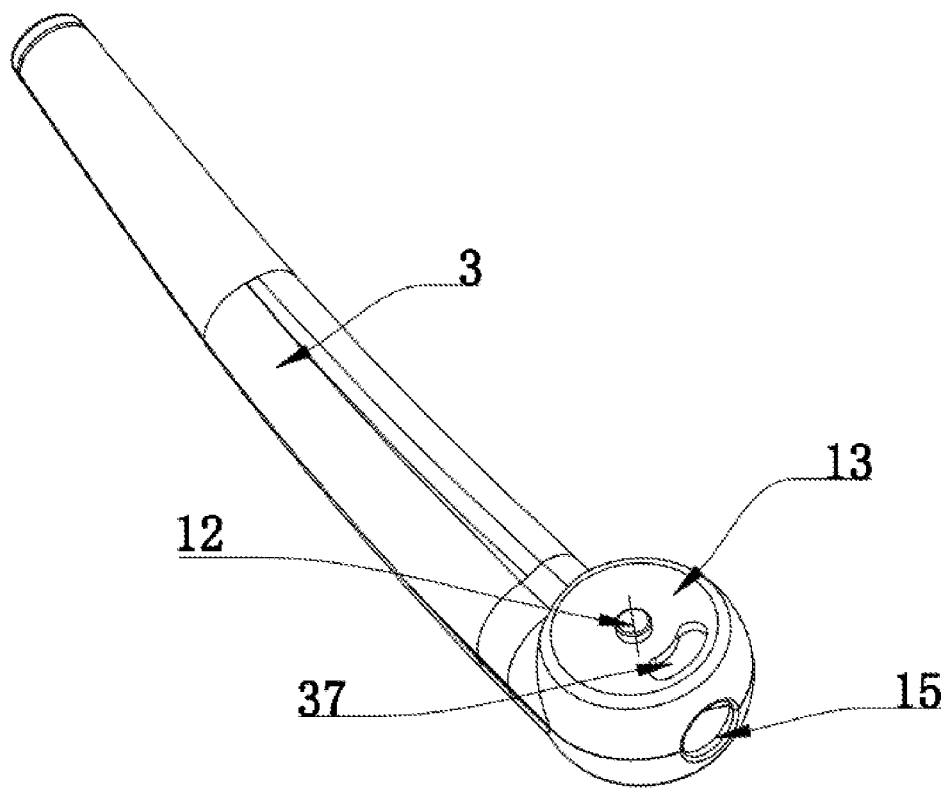
FIG. 9 is a perspective view of another spout of one embodiment of the foldable watering pot of the present invention.

As shown in FIG. 9, the structure and principles of this embodiment are basically the same as those of embodiment 1. The differences are that two sides of the coupling end 13 are disposed with a limiting slot 37, and in this embodiment, the limiting slot 37 is a kidney-shaped slot, and at least one of the positioning pins 9 on the framework 1 extends outside of the positioning hole 8 to be located in the limiting slot 37 to limit the spout 3; the positioning pins 9 in this embodiment are among those positioning pins 9 triangularly distributed in the coupler 7, and these particular positioning pins 9 extend from the lowermost positioning holes 8, and, respectively, extend into the limiting slots 37 on the two sides.

Embodiment 3

The structure and principles of this embodiment are basically the same as those of embodiment 1. The differences are that the assembly 24 has at least one positioning groove 30, and inside the passage 26 of the framework 1 is disposed with a bulge 28 matching the positioning groove 30.

Embodiment 4

The structure and principles of this embodiment are basically the same as those of embodiment 1. The differences are that the positioning member is a plurality of annularly distributed and spaced apart positioning blocks arranged at intervals on the inner end surface 34 of the lid 32. When the lid 32 is tightened on the inlet component 5, the inner wall 27a of the inlet 27 abuts tightly against the positioning blocks, and the positioning blocks support and position the connector 25. In this embodiment, the external thread of the connector 25 and the internal thread of the lid 32 are connected, and the end face 33 of the connector 25 is mated with the inner end surface 34 between the positioning blocks and the inner thread of the lid 32 to form a seal.

Embodiment 5

The structure and principles of this embodiment are basically the same as those of embodiment 1. The differences are that the inlet component 5 is made of a hard material, the container 2 is tightly fixed with the inlet component 5 by glue, clamping, blow molding or other means of forming a connection with the inlet component 5, and the lid 32 can form a seal with the inlet component 5.

The specific embodiments described herein are merely illustrative of the spirit of the present invention. Technical personnel skilled in the art to which the present invention pertains can make various modifications or additions to the specific embodiments described or replace them in a similar manner, without departing from the spirit of the present invention or beyond the scope defined by the appended claims.

LIST OF REFERENCED PARTS 1 framework
2 container
3 spout
5 inlet component
6 outlet
7 coupler
8 positioning hole
9 positioning pin
10 flange
11 rotary mounting hole 12 rotary mounting pin
13 coupling end
14 arcuate groove
15 opening
16 seal ring
17 left frame
18 right frame
19 nozzle
20 hull
21 base spray plate
22 rotary spray plate
23 handle
24 assembly
25 connector
26 passage
27 inlet
27a inner wall
28 bulge
30 positioning groove
32 lid
33 end face
34 inner end surface
35 positioning ring
36 outer wall
37 limiting slot

What is claimed is:

1. A foldable watering pot, comprising:
a hollow rigid framework;
a flexible container with an inlet component and an outlet, the flexible container detachably mounted in a hollow portion of the framework;
a connecting device fixedly connected to the container, the connecting device comprising a coupler; and
a spout;
wherein two opposite sides of the coupler are respectively disposed with a rotary mounting hole, and the spout is provided with a rotary mounting pin rotatably inserted in the rotary mounting hole, so that the spout is rotatably connected with the coupler, an axis of the rotary mounting pin and an axis of the rotary mounting hole are horizontal, so that the spout is capable of swinging up and down at the coupler;
wherein the spout has a coupling end connected with the coupler, an end surface of the coupling end is cylindrical or spherical, the end surface is facing the coupler, the coupling end is inserted in an arcuate groove disposed on the coupler and matched with the end surface of the coupling end, and the end surface of the coupling end has an opening to communicate with the spout and container, the coupler at the arcuate groove is provided with a hole to communicate with the opening and the outlet, the end surface of the coupling end is capable of blocking the hole, an area of the end surface of the coupling end blocking the hole is capable of being adjusted when the spout swings up and down; and
wherein the coupler is disposed with positioning holes on the two sides of the coupler, inside the framework is correspondingly disposed with positioning pins matching the positioning holes, and one side of the coupling end is disposed with a limiting slot, and at least one of the positioning pins extends outside of the positioning hole to be located in the limiting slot.

2. The foldable watering pot as claimed in claim 1, wherein the framework is further disposed with a flange capable of wrapping an edge of the coupler.

3. The foldable watering pot as claimed in claim 2, wherein two sides of the coupling end are disposed with the limiting slot.

4. The foldable watering pot as claimed in claim 1, wherein inside the coupler is disposed with a seal ring sealingly connected with the coupling end.

5. The foldable watering pot as claimed in claim 1, wherein the framework comprises a left frame and a right frame.

6. The foldable watering pot as claimed in claim 1, wherein the spout is connected with a nozzle, the nozzle comprises a hull, a base spray plate, and a rotary spray plate rotatably connected to an edge of the hull, and the rotary spray plate and the base spray plate are disposed with perforations.

7. The foldable watering pot as claimed in claim 1, wherein the container is made of a soft waterproof material.

8. The foldable watering pot as claimed in claim 1, wherein the framework is further disposed with an inverted L-shaped handle on one side of the framework.

9. The foldable watering pot as claimed in claim 1, wherein the inlet component comprises an assembly and a threaded connector, the inlet component is disposed with an inlet penetrating the assembly and the connector, and the inlet communicates with an inner cavity of the container.

10. The foldable watering pot as claimed in claim 9, wherein the inlet component and the container are made of a same material, and a wall thickness of the inlet component is greater than a wall thickness of the container.

11. The foldable watering pot as claimed in claim 9, wherein the framework is disposed with a passage, the assembly is disposed in the passage and connected with the framework, and the connector extends outside of the framework.

12. The foldable watering pot as claimed in claim 11, wherein the assembly has at least one bulge, and inside the passage of the framework is disposed with a positioning groove matching the bulge.

13. The foldable watering pot as claimed in claim 9, wherein the connector is connected with a lid, and the lid is capable of forming a seal with the connector.

14. The foldable watering pot as claimed in claim 13, wherein the connector is disposed with at least one turn of external thread, and the lid is disposed with at least one turn of internal thread matching the external thread of the connector.

15. The foldable watering pot as claimed in claim 13, wherein the lid is disposed with a positioning member, when the lid is connected to the inlet component, the positioning member abuts against an inner wall of the inlet.

16. The foldable watering pot as claimed in claim 15, wherein the positioning member is a positioning ring disposed in the lid, the positioning ring has a sloped outer wall, a diameter of the outer wall gradually decreases from an inner end surface of the lid in an axial direction away from the inner end surface of the lid.

17. The foldable watering pot as claimed in claim 16, wherein the outer wall located on the inner end surface of the lid has a diameter slightly larger than a diameter of the inlet, and a diameter of the outer wall away from the inner end surface of the lid is slightly smaller than the diameter of the inlet.

18. The foldable watering pot as claimed in claim 13, wherein an end face of the connector is a flat surface, and the end face is capable of mating with the inner end surface of the lid to form a seal.

* * * * *